United States Patent
Bell et al.

(10) Patent No.: US 9,513,851 B2
(45) Date of Patent: Dec. 6, 2016

(54) SYSTEM AND METHOD FOR USER-SELECTABLE FONT SUBSTITUTION TO FACILITATE PRINTING

(75) Inventors: Lynn M. Bell, Fairport, NY (US); Matthew O. Scrafford, Fairport, NY (US); Jason C. Tsongas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 618 days.

(21) Appl. No.: 13/228,873

(22) Filed: Sep. 9, 2011

(65) Prior Publication Data

US 2013/0063734 A1   Mar. 14, 2013

(51) Int. Cl.
*G06K 15/00* (2006.01)
*G06F 3/12* (2006.01)
*G06K 15/02* (2006.01)

(52) U.S. Cl.
CPC ............ *G06F 3/1208* (2013.01); *G06F 3/123* (2013.01); *G06F 3/1244* (2013.01); *G06F 3/1288* (2013.01); *G06K 15/002* (2013.01); *G06K 15/1827* (2013.01); *G06F 3/1255* (2013.01)

(58) Field of Classification Search
CPC ....................................... G06F 3/123
USPC ....... 358/1.6, 1.3, 1.4, 1.5; 400/70; 395/110, 395/115
See application file for complete search history.

(56) References Cited

U.S. PATENT DOCUMENTS

| | | | |
|---|---|---|---|
| 5,506,940 A * | 4/1996 | Bamford | G06K 15/1827 358/1.11 |
| 7,199,894 B2 | 4/2007 | Lester et al. | |
| 7,982,737 B2 | 7/2011 | Leroy | |
| 2002/0136578 A1* | 9/2002 | Johnson | G06K 15/02 400/70 |
| 2006/0232588 A1 | 10/2006 | Opstad et al. | |
| 2008/0303822 A1 | 12/2008 | Taylor et al. | |
| 2010/0128294 A1 | 5/2010 | Sloan, Jr. et al. | |
| 2011/0109929 A1 | 5/2011 | Korndoerfer | |

* cited by examiner

*Primary Examiner* — Bharatkumar Shah
(74) *Attorney, Agent, or Firm* — Ronald E. Prass, Jr.; Prass LLP (57) ABSTRACT

According to aspects of the embodiments, there is provided systems and methods that involve providing user-selectable fonts to a printing device so that the printing device can facilitate printing of a print task. In this regard, a representative embodiment of a method and system for printing includes enabling a print file corresponding to a print task to be evaluated, and, if it is determined that a printing device to which the print task is directed is unable to process the print task without performing a font substitution, enabling acquiring of the fonts from a specific user. By using the uploaded fonts, the printing device is able to process the print task without performing a font substitution.

13 Claims, 7 Drawing Sheets

SYSTEM AND METHOD FOR USER-SELECTABLE FONT SUBSTITUTION TO FACILITATE PRINTING

BACKGROUND

The present invention generally relates to printing. More specifically, the present invention relates to substituting user-selectable fonts in a printing device to facilitate a print task.

A user in a printing environment has access to multiple printing devices. The printing devices include, but are not limited to, printer, digital copier, facsimile unit and multi-function machine (scanner/copier/printer). To facilitate the printing it is sometimes necessary to perform font substitution when an electronic document is sent to a printer with a PDL requirement for a particular font which has not been loaded into the target printer or its spooler or server. So another font is automatically substituted in some cases before printing. Fonts may include a set of glyphs, each of which may represent the shape of various characters (e.g., graphemes, numerals, symbols, and/or punctuation marks). Fonts may have different styles, which may be reflected in the shape of each font's constituent glyphs. The style of a particular glyph is typically similar to the style of another glyph of the same font.

Typically, fonts, i.e., a font set and its associated algorithms, are licensed for use by one printing device. Therefore, when that printing device requires the use of a particular licensed font, the printing device accesses the font set so that raster bits corresponding to the desired font raster bits can be produced. If a user desires to print a particular font using a printing device that does not have access to the font set, a page description language (PDL) associated with the printing device typically will perform a font substitution. In particular, the PDL can enable another font, e.g., a font that possesses similar characteristics to the unavailable font, to be printed in place of the requested font. Problematically, however, a font substitution operation typically does not provide a document with printed information that directly corresponds to the document that a user intended to print causing the print output to be skewed. Font substitution increases the potential that a user may end up with print output that is of poor quality causing print waste and frustration with the system and device from which the job was printed.

Based on the foregoing, it should be appreciated that there is a need for improved systems and methods that address the aforementioned and/or other shortcomings of the prior art.

SUMMARY

According to aspects of the embodiments, there is provided systems and methods that involve providing user-selectable fonts to a printing device so that the printing device can facilitate printing of a print task. In this regard, a representative embodiment of a method and system for printing includes enabling a print file corresponding to a print task to be evaluated, and, if it is determined that a printing device to which the print task is directed is unable to process the print task without performing a font substitution, enabling acquiring of the fonts from a specific user. By using the uploaded fonts, the printing device is able to process the print task without performing a font substitution.

DETAILED DESCRIPTION

Aspects of the embodiments disclosed herein relate to methods and systems to prompt a user to select a font for substitution when not available for printing.

Aspects of the disclosed embodiments relate to a computer-implemented method for printing comprising enabling information corresponding to a print task to be evaluated; and if it is determined that a printing device to which the print task is directed is unable to process the print task without performing a font substitution, enabling additional information to be acquired by sending a message to a user requesting at least one preferred font to enable the printing device to perform the print task.

Another aspect of the disclosed embodiments relate to a print system comprising a print management device configured to evaluate a print file corresponding to a print task and to acquire additional information such that, if it is determined that a printing device to which the print task is directed is unable to process the print task without performing a font substitution, the print management device enables the additional information to be acquired, thereby enabling the printing device, by using the additional information to process the print task , the print management device comprising a processor and a memory coupled to the processor, wherein the memory comprises program instructions executable by the processor to: evaluate the print file to determine if font substitution is needed to process the print task at the printing device; and in response to determining that font substitution is needed sending a message to a user requesting additional information to enable the printing device to perform the print task.

In yet another aspect of the disclosed embodiment a system for user selected font substitution where evaluating the print file comprises identifying at least one font needed to process the print task and comparing the identified at least one font to available fonts in a storage device.

In yet another aspect of the disclosed embodiment a system for user selected font substitution where the message is at least one of an email message; a short message service message; an instant message; and an electronic document.

In yet another aspect of the disclosed embodiment a system for user selected font substitution where the message comprises a. set of selectable options to enable the printing device to perform the print task.

In yet another aspect of the disclosed embodiment a system for user selected font substitution where the set of options comprise at least one of a link to an uploader module configured to facilitate the upload of at least one substitute font; a link pointing to a font file to substitute the at least one font, option to select an equivalent font that could be use as a substitute for the at least one font, and one or more selectable control.

In yet another aspect of the disclosed embodiment a system for user selected font substitution further comprising program instructions executable by a processor to receiving an indication from the user of a selected option from the set of selectable options; and if the user chooses to substitute the at least one font, processing the print task with the substitute for the at least one font.

In yet another aspect of the disclosed embodiment a system for user selected font substitution further comprising program instructions executable by the processor to register and install the uploaded font to be used exclusively by a set of users.

Aspects of the disclosed embodiments relate to a non-transitory computer-readable storage medium in a printing system, comprising program instructions computer-executable to receive a print file corresponding to a print task for the printing system, wherein the print file comprises a text string comprising a plurality of characters, and a respective preferred font for each character of said plurality of characters; evaluate the print file to determine if font substitution is needed to process the print task at the printing system; and in response to determining that font substitution is needed sending a message to a user requesting the preferred font to enable the printing system to perform the print task.

The term "print engine" as used herein refers to a digital copier or printer, scanner, image printing machine, digital production press, print queue, document processing system, processor, image reproduction machine, bookmaking machine, facsimile machine, multi-function machine, or the like and can include several marking engines, feed mechanism, scanning assembly as well as other print media processing units, such as paper feeders, finishers, and the like.

The term "print media" generally refers to a usually flexible, sometimes curled, physical sheet of paper, plastic, or other suitable physical print media substrate for images, whether precut or web fed.

A "target device" is a managed node, such as a printer, computer, print engine, scanner, and the like, that is linked to a computer network.

A "Client" refers to any computational device that is able to send print jobs to a printer. Client devices include, for example a personal computer, workstations, processing systems such as servers, distributed processors, computing clusters, and the like, that execute programs that generate data to be sent to a printer. Such systems are capable of hosting, for instance, databases, application, document generation systems, and any suitable processing able to generate data.

A "Print Server" refers to a processing device that hosts queues for network connected print engines. Print servers can be stand alone processors or exist as one or more processes resident on a server or in a client functioning as a server. Print servers are generally accessible by clients and provide print driver packages to clients in order to support establishing print queues on the client device.

A "Default Location" refers to a default enterprise accessible location, client, or to devices tethered to a client such as flash drives and external hard disk drives ("hdd"). An example default location would be, for instance, the location given by: "h:\ system\printer\".

An "application" refers to a program designed for end users of a computing device, such as a word processing program, a database program, a browser program, a spreadsheet program, a gaming program, and the like. An application is distinct from systems programs, which are low-level programs that interact with the computing device at a very basic level, such as an operating system program, a compiler program, a debugger program, programs for managing computer resources, and the like.

As used herein relational terms such as "first," "second," and the like may be used solely to distinguish one entity or action from another entity or action without necessarily requiring or implying any actual such relationship or order between such entities or actions. Also, relational terms, such as "offset", "upstream", "downstream", "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

A computational device may be embodied within devices such as a desktop computer, a laptop computer, a handheld computer, a handheld communication device, or another type of computing device, or the like. A computational device has at a minimum a memory, a processor, input/output devices such as a display or a communication interface, and an operator interface for a user to interact with the computational device. The Processor may include at least one conventional processor or microprocessor that interprets and executes instructions. The memory may be a random access memory (RAM) or another type of dynamic storage device that stores information and instructions for execution by the processor. Memory may also include a read-only memory (ROM) which may include a conventional ROM device or another type of static storage device that stores static information and instructions for the processor. The Input/output devices (I/O devices) may include one or more conventional input mechanisms that permit a user to input information to the computational device, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display may typically be an LCD or CRT display as used on many conventional computing devices, or any other type of display device.

The memory may store instructions that may be executed by the processor to perform various functions. For example, the memory may store a print management service to receive a print file corresponding to a print task for a printing system, wherein the print file comprises a text string comprising a plurality of characters. A print management service to evaluate a print file to determine if font substitution is needed to process the print task at the printing system. A print management service to determining that font substitution is needed sending a message to a user requesting the preferred font to enable the printing system to perform the print task. A print management service to receive an indication from the user of a selected option from the set of selectable options; if the user chooses to upload the preferred font and processing the print task with the uploaded preferred font.

Figure 1:
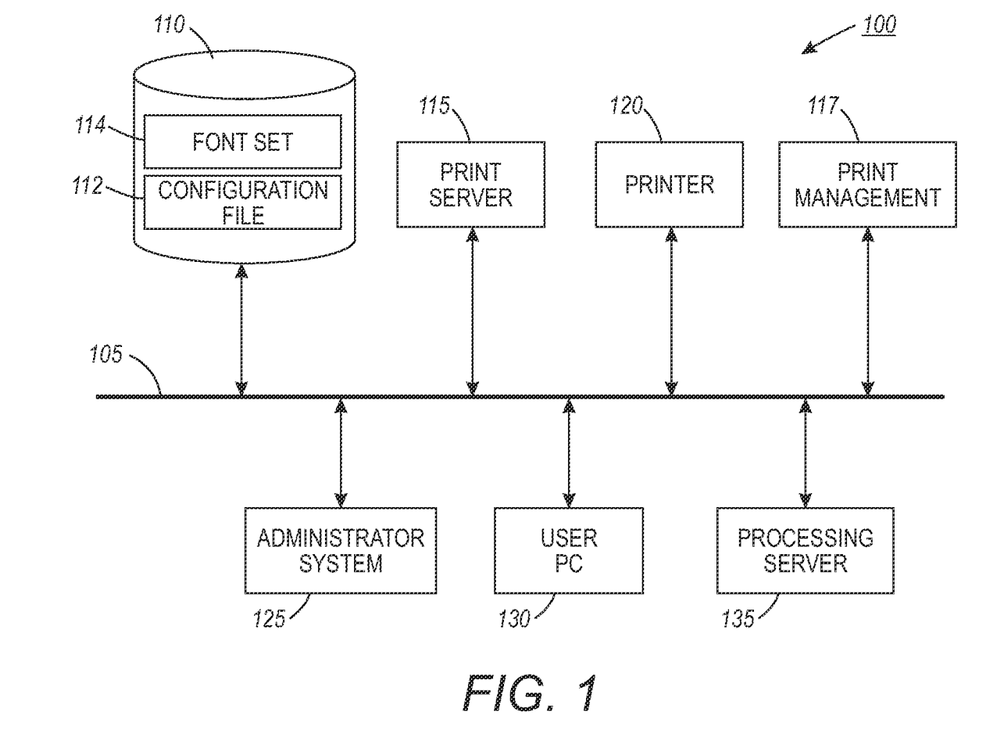
FIG. 1 is an illustration of a networked printing environment in accordance to an embodiment.

FIG. 1 is an illustration of a networked printing environment 100 in accordance to an embodiment. The networked printing environment 100 shows the devices connected by a communications network 105 that provides a data communications network among various computing resources such as client devices such as User PC 130, processing server 135, and print server 115. The processing server 135 includes, for instance, a server that hosts one or more operational programs, including databases, accounting systems, and the like. The User PC 130 can be a conventional personal computer able to install one or more print drivers. The networked printing environment 100 may include a print job management device 117 and a printer 120. Note that the print management device 117 and the printer 120 may be located in the same device, such as the printer 120, or in separate devices. The print job management device 117 may communicate with the printer 120 either through a wired or a wireless connection, for example. Central data storage 110 is located in an enterprise accessible location and stores at least one printer configuration file 112 and a font set file 114. The enterprise accessible location can be the default location for a client in order to maintain a local copy of the configuration file. In one embodiment, the central data storage 110 stores at least one font set 114 that is accessed by all computers using printers on a network and the font set 114 is applied by the print drivers on all print servers, printers, and computers to ensure an enterprise-wide printer configurations.

An administrator system 125 or print management station is used by administrators (SA) to create or modify a printer configuration file and to update the fonts available for print servers such as "mobile print". The SA uses a printer driver configuration management utility, which allows the SA to establish parameters or settings for multiple printer drivers and multiple printing devices with a single multi-tiered configuration file. The printer driver configuration management utility may further allow the administrator to specify an interval at which devices such as clients are to access the central data storage to determine if an update to the configuration file or font set exists. In a preferred embodiment, printers and print servers 115 initiate the update method each time it is powered up, and may further initiate the update method after selected intervals of time, e.g., once every twelve hours while it remains powered up. However, those skilled in the art will recognize, after perusal of this application, that there are no specific times when the update method must be initiated, and that selection of various times for initiation of the method are within the scope and spirit of the invention. Regardless of when the updates are initiated the client queries the central data storage and applies any changes made to the configuration file or font set file to the print driver for the selected printing device.

Figure 2:
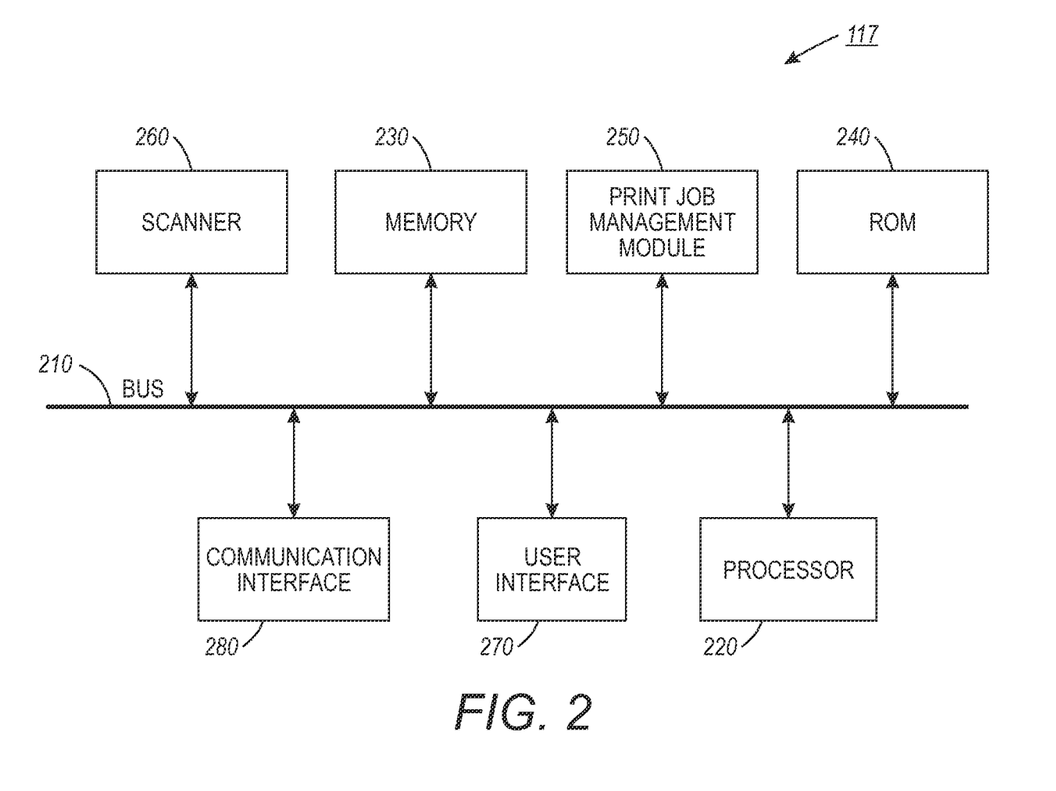
FIG. 2 illustrates a block diagram of a print management device for a printer system in accordance to an embodiment.

FIG. 2 illustrates a block diagram of a print management device 117 in accordance with one possible embodiment of the disclosure. The print management device 117 may include may include a bus 210, a processor 220, a memory 230, a read only memory (ROM 240, a print job management module 250, a scanner 260, a user interface 270, and a communication interface 280. Bus 210 may permit communication among the components of the print management device 117.

Processor 220 may include at least one conventional processor or microprocessor that interprets and executes instructions. Memory 230 may be a random access memory or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a local, remote or external network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

The user interface 270 may include one or more conventional input mechanisms that permit a user to input information, communicate with the print management device 117, and/or present information to the user, such as an electronic display, microphone, touchpad, keypad, keyboard, mouse, pen, stylus, voice recognition device, buttons, one or more speakers, etc. Output mechanisms for the user interface 270 may include one or more conventional mechanisms that output information to the user, including a display, a printer, one or more speakers, or a medium, such as a memory, or a magnetic or optical disk and a corresponding disk drive.

The scanner 260 may represent any scanner or scanning device known to those of skill in the art that may scan documents and/or images for processing.

The print management device 117 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The print management device 117 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the print management device 117, such as a communication server, communications switch, communications router, or general purpose computer, for example.

Generally, program modules include routine programs, objects, components, data structures, etc. that performs particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Figure 3:
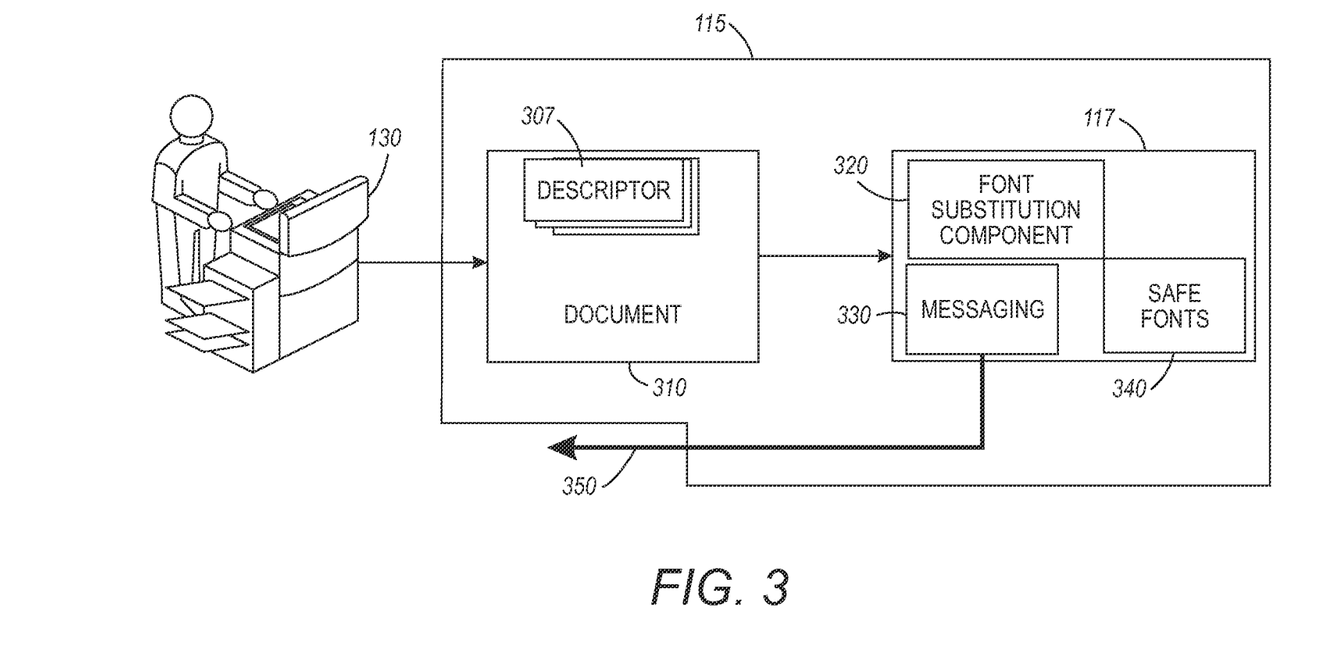
FIG. 3 is a data flow diagram illustrating the transfer of documents from a computer system to a print management service at a server in accordance to an embodiment.

FIG. 3 is a data flow diagram illustrating the transfer of documents from a computer system to a print management service at a server in accordance to an embodiment. As illustrated in FIG. 3, a plurality of descriptor items 307 included within a print file, such as document 310 may be transferred from one computer system such as user PC 130 to another computer system, such as print management 117 to be process in accordance to a print task to be performed by a printing device. A print management functions can be a service performed by print server 115, printer, or other computational device having instructions to perform such as service. The transfer of document 310 may be performed in a variety of ways including, but not limited to, transferring the document over a network, such as a local area network (LAN), wide area network (WAN) (e.g., the Internet), or some combination thereof. In some embodiments, the transfer of document 310 may occur through a physical medium, such as a compact disk or flash memory device. One skilled in the art will recognize various techniques for transferring a document or file between computer systems; it is the intention of various embodiments to include such techniques.

The descriptor items 307 correspond to information as to the resources (e.g., fonts, forms, XObjects, images, and the like) needed to perform a print task such as printing a document on a printer. The descriptor items 307 are inspected to ascertain at least one preferred font or the font(s) used in the document 310. One way to ascertain this information includes inspecting the raster bits (e.g., bit-mapped data) associated with the font that is to be printed by the printing device. Another way is to inspect the submitted document for the fonts that are used therein. In yet another way is to have the information corresponding to the required font(s) be provided by one or more devices coupled to the network 105. The document and the information as to the required font(s) is used by the print management device 117 to identify fonts requiring substitution 320 and those fonts that are safe fonts 340. The user is then notified via a messaging service 330 as to those fonts that require substitution. The message can be in such forms as an email message, a short message service message, an instant message, and an electronic document.

Figure 4:
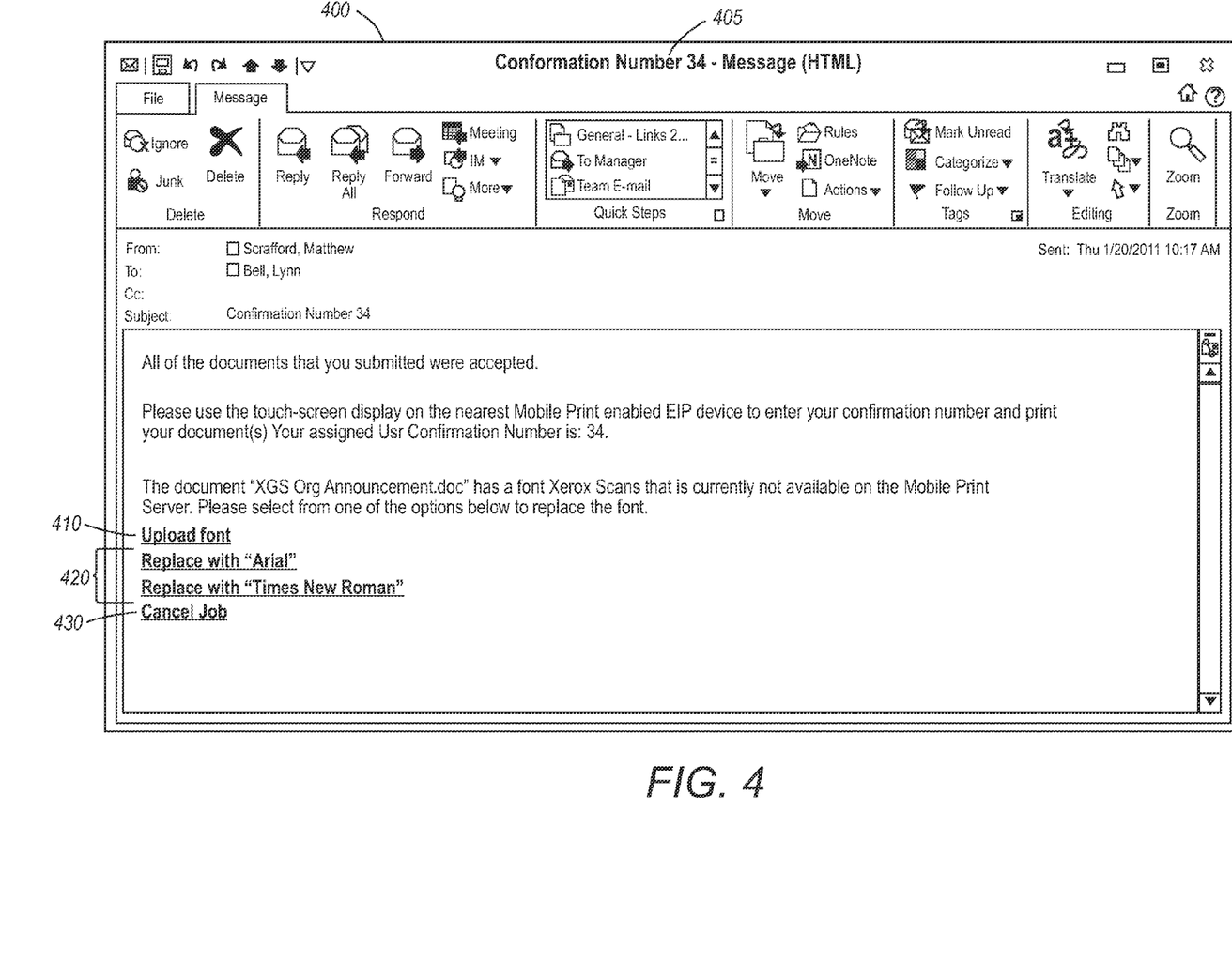
FIG. 4 is a screenshot of a message from a print management service to a user in accordance to an embodiment.

FIG. 4 is a screenshot of a message 400 from a print management service to a user in accordance to an embodiment. The message 400 has a body and a subject heading that uniquely identifies the print task. As shown message 400 is an email message having a subject that identifies the print task by a "confirmation number". Additionally, the message comprises a. set of selectable options (410, 420, 430) to facilitate the user-selectable font substitution. The selectable option comprise a link 410 to an uploader module configured to facilitate the upload of at least one substitute font; a link pointing to a font file (not shown) to substitute the at least one font, option to select an equivalent font 420 that could be use as a substitute for the at least one font, and an one or more selectable control 430 such as cancellation of the print task. It should be noted that the goal of message 400 is to notify and provide a means to resolve the font disparity.

Figure 5:
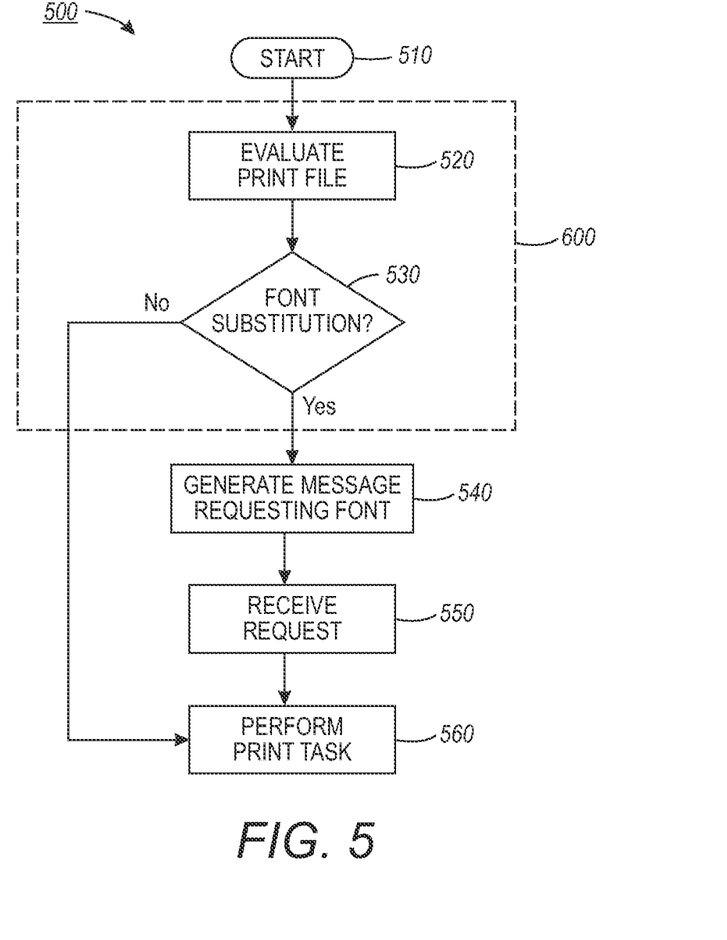
FIG. 5 is a flowchart of a method for user-selectable font substitution in accordance to an embodiment.
Figure 6:
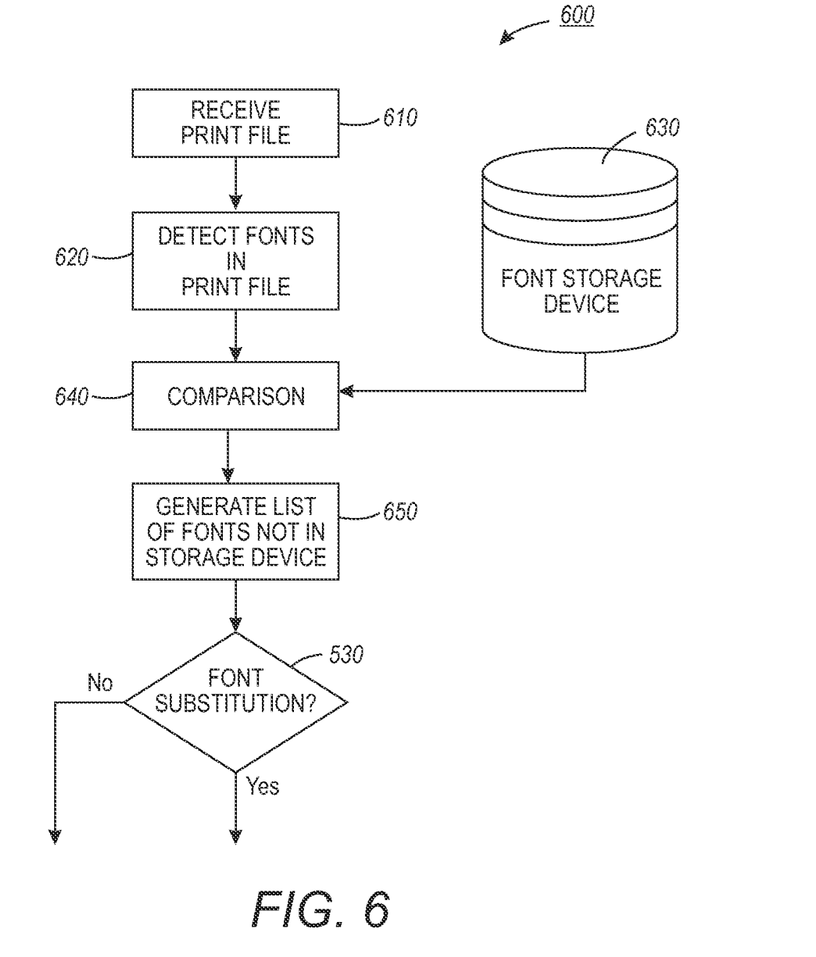
FIG. 6 is a flowchart of a method for detecting the fonts present in a print file and for comparing the detected fonts to available fonts in a storage device in accordance to an embodiment.

FIG. 5 is a flowchart of a method for user-selectable font substitution in accordance to an embodiment. Action 510 begins method 500. Method 500 is invoked when a print file is submitted to the print management service for processing at a printing device. Action 520 evaluates the print file to ascertain the fonts being used in the print file. Decision 530 then determines if font substitution is needed. It is noted that both action 520 and decision 530 form part of method 600 that evaluates the print file for font substitution with respect to the font set in a storage device such as data storage 110. If decision 530 concludes that font substitution is not required control is passed to action 560 where a suitable printing device performs the print task. However, if decision 530 concludes that at least a font substitution is needed control is passed to action 540 where a message such as message 400 requesting the one or more fonts is generated and send to the user for processing. In action 550, method 500 waits until the user is able to provide it with the substitute fonts or until the request is fulfilled After receiving the request in action 550 control is then passed to action 560 for further processing.

FIG. 6 is a flowchart of a method 600 for detecting the fonts present in a print file and for comparing the detected fonts to available fonts in a storage device in accordance to an embodiment. Method 600 evaluates the print file to determine if font substitution is needed to perform the print task at the printing device. Method 600 starts with action 610 where the method receives a print file for processing. Once a print job 610 is submitted to the print management such as print server 115 to be printed it will detect 620 the fonts present in the file and compare 640 it to the available fonts on the server 630. If the font(s) is not in the available list, method 600 generates a list 650 of the fonts that are not in the list as described with reference to FIG. 3. Based on the generated list a determination is made as to the need for font substitution to complete the print task. If a font is missing substitution will be needed and the user will be given the chance to correct or provide a suitable substitution. As noted with reference to method 500 a message 400 will be sent to the user notifying the user that the preferred font is not available and provide a list of options for the user to select from. These options would include available fonts for substitution, the ability to cancel the job, and the ability to upload the font to the system via email. At a client device the user could be provided with a link to a default location to upload the required font.

Figure 7:
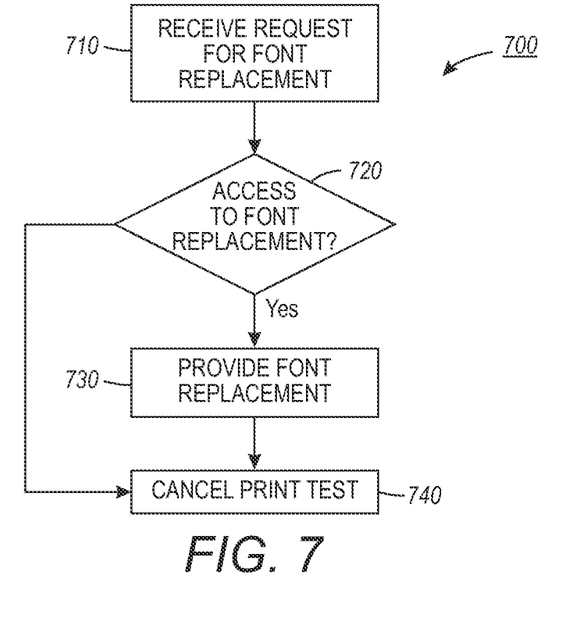
FIG. 7 is a flowchart of a method for font request replacement at a client device in accordance to an embodiment.

FIG. 7 is a flowchart of a method 700 for font request replacement at a client device in accordance to an embodiment. Typically, the request is received from the print management device that provided the request; however, such a request could be provided by another device as arranged by the system administrator. Method 700 begins with action 710. In action 710 the user receives, at a client device, a message to substitute the fonts for the print file. As noted above with reference to FIG. 4 the message contains a list of options to substitute the fonts. These options would include available fonts for substitution, the ability to cancel the job, and the ability to upload the font to the system via email as an attachment. If the user has access to the font replacement 720 then the user can provide the font replacement 730 following the options provided in message 400. It should be noted that access to the font replacement can include providing an equivalent font as describe in FIG. 4 If the user does not have access to the font replacement then the user can elect to cancel the print task 740.

Figure 8:
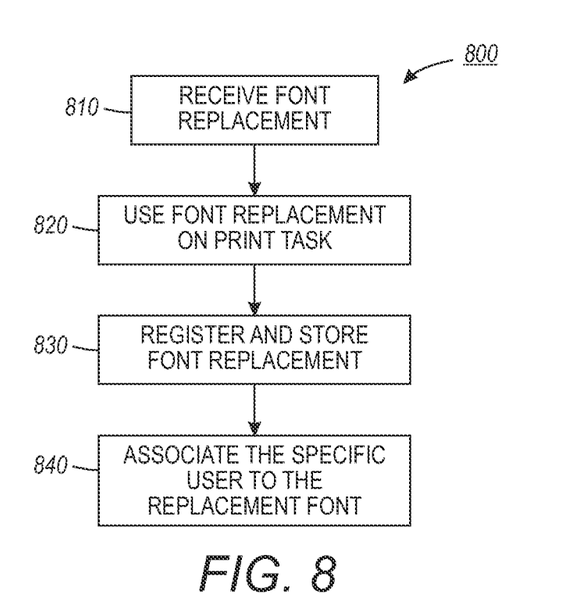
FIG. 8 is a flowchart of a method for font replacement at a print management service in accordance to an embodiment.

FIG. 8 is a flowchart of a method for font replacement at a print management service in accordance to an embodiment. If the user chooses to upload the missing font such as through the "Upload Font" link 410 in the notification or message 400 and attach the desired font to the message. The same methods will be used by the system to process the font as is used when sending a normal print job, so no new workflows are introduced to the user. The print management device will identify the font using the extension of the file, such as TrueType Fonts (TTF) and OpenType Fonts (OTF). Upon receipt 810, the system will automatically use the font replacement on print task 820; the system will register and store the font replacement 830, and assign rights or associate to use the font to the specific user 840 who submitted it. User management of fonts is required to ensure that copyrights are protected. If another user submits the same font, the print management service will add that user to the list of permitted users—it will not try to register and install the font a second time. The font management can be a service provided by central data storage 110 using well known digital rights management (DRM) techniques. Rights to the font can be assigned to the users who upload the fonts only, to members of a group, or to all users.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A print system comprising:
   a print management device configured to perform a print management service at a server to evaluate a print file corresponding to a print task and to acquire additional information such that, if it is determined that a printing device to which the print task is directed is unable to process the print task without performing a font substitution, the print management device enables the additional information to be acquired, thereby enabling the printing device, by using the additional information to process the print task, the print management device comprising a processor and a memory coupled to the processor, wherein the memory comprises program instructions executable by the processor to:
   evaluate the print file to determine if font substitution is needed to process the print task at the printing device;
   IF it is determined that font substitution is needed, then acquiring font substitution by:
   preparing a message comprising a set of selectable options to facilitate the user-selectable font substitution to enable the printing device to perform the print task and wherein the set of selectable options comprise a link to an uploader module configured to facilitate the upload of at least one substitute font, upload the font via email, a link pointing to a font file to substitute the at least one font, an option to select an equivalent font that could be use as a substitute for the at least one font, and one or more selectable control,
   sending to a user the prepared message with the selectable options to provide the print management device with the requested additional information to enable the printing device to perform the print task;
   delaying processing of the print task until receiving an indication from the user of a selected option from the set of selectable options to facilitate the user-selectable font substitution;
   IF the user chooses to substitute the at least one font by using one of the set of selectable options, THEN processing the print task with the substitute for the at least one font;
   IF the user chooses the one or more selectable control, THEN canceling the print task.

2. The system in accordance to claim 1, wherein evaluating the print file comprises identifying at least one font needed to process the print task and comparing the identified at least one font to available fonts in a storage device.

3. The system in accordance to claim 2, wherein the message is at least one of an email message; a short message service message; an instant message; and an electronic document.

4. The system in accordance to claim 1, the memory further comprising program instructions executable by the processor to: register and install the uploaded font to be used exclusively by a set of users.

5. A non-transitory computer-readable storage medium in a printing system, comprising program instructions computer-executable to:
   receive a print file corresponding to a print task for the printing system, wherein the print file comprises a text string comprising a plurality of characters, and a respective preferred font for each character of said plurality of characters;
   evaluate the print file to determine if font substitution is needed to process the print task at the printing system; and
   IF it is determined that font substitution is needed, then acquiring font substitution by:
   preparing a message comprising a set of selectable options to facilitate font substitution to enable the printing system to perform the print task and wherein the set of selectable options comprise a link to an uploader module configured to facilitate the upload of at least one substitute font, upload the font via email, a link pointing to a font file to substitute the at least one font, an option to select an equivalent font that could be use as a substitute for the at least one font, and one or more selectable control, sending to a user the prepared message with the selectable options to provide a print management service with the requested additional information to enable the printing system to perform the print task;

delaying processing of the print task until receiving an indication from the user of a selected option from the set of selectable options to facilitate the user-selectable font substitution;

IF the user chooses to substitute the at least one font by using one of the set of selectable options, THEN processing the print task with the substitute for the at least one font.

6. The non-transitory computer-readable storage medium of claim 5, wherein evaluating the print file comprises identifying preferred font needed to process the print task and comparing the identified preferred font to available fonts in a storage device.

7. The non-transitory computer-readable storage medium of claim 6, wherein the message is at least one of an email message; a short message service message; an instant message; and an electronic document.

8. The non-transitory computer-readable storage medium of claim 7, further comprising program instructions computer-executable to: register and install the uploaded preferred font to be used exclusively by a set of users.

9. A computer-implemented method for printing comprising:

configuring a print management device to perform a print management service at a server to evaluate a print file corresponding to a print task and to acquire additional information when needed to complete the print task at a printing device;

enabling information corresponding to a print task to be evaluated; and determining if the printing device to which the print task is directed to is able to process the print task without performing a font substitution;

IF it is determined that font substitution is needed, then acquiring font substitution by:

preparing a message comprising a set of selectable options to facilitate font substitution to enable the printing device to perform the print task and wherein the set of selectable options comprise a link to an uploader module configured to facilitate the upload of at least one substitute font, upload the font via email, a link pointing to a font file to substitute the at least one font, an option to select an equivalent font that could be use as a substitute for the at least one font, and one or more selectable control, sending to a user the prepared message with the selectable options to provide the print management service with the requested additional information to enable the printing device to perform the print task;

delaying processing of the print task until receiving an indication from the user of a selected option from the set of selectable options to facilitate the user-selectable font substitution;

IF the user chooses to substitute the at least one font by using one of the set of selectable options, THEN processing the print task with the substitute for the at least one font.

10. The computer-implemented method in accordance to claim 9, wherein evaluating the print task comprises identifying from a print file at least one preferred font needed to process the print task and comparing the identified at least one preferred font to available fonts in a storage device.

11. The computer-implemented method in accordance to claim 9, wherein the message is at least one of an email message; a short message service message; an instant message; and an electronic document.

12. The computer-implemented method in accordance to claim 11, wherein the one or more selectable control comprises at least canceling the print task.

13. The computer-implemented method in accordance to claim 12, wherein evaluating the print task comprises inspecting a document's descriptor items to ascertain at least one preferred font in the document.

* * * * *